(12) United States Patent
Browne et al.

(10) Patent No.: US 6,286,141 B1
(45) Date of Patent: Sep. 4, 2001

(54) PERSONAL EDITING SYSTEM

(75) Inventors: H. Lee Browne, Greenwich, CT (US); Carl M. Elam, Perry Hill, MD (US); David H. Schmidt, Rowayton, CT (US)

(73) Assignee: Soundview Technologies Incorporated, Pasadena, CA (US)

( * ) Notice: Subject to any disclaimer, the term of this patent is extended or adjusted under 35 U.S.C. 154(b) by 0 days.

(21) Appl. No.: 08/861,741

(22) Filed: May 22, 1997

(51) Int. Cl.⁷ .................................................. H04N 5/445
(52) U.S. Cl. ................................. 725/39; 348/734
(58) Field of Search .................. 348/1, 10, 906, 348/460, 734, 725, 563, 564; 725/39–47, 53–58

(56) References Cited

U.S. PATENT DOCUMENTS

| | | | |
|---|---|---|---|
| 4,554,584 | 11/1985 | Elam et al. | 358/165 |
| 4,605,964 | 8/1986 | Chard | 358/147 |
| 4,751,578 | * 6/1988 | Reiter et al. | 348/906 |
| 5,253,066 | 10/1993 | Vogel | 358/188 |
| 5,425,100 | 6/1995 | Thomas et al. | 380/20 |
| 5,479,266 | 12/1995 | Young et al. | 358/335 |
| 5,692,214 | * 11/1997 | Levine | 395/833 |
| 5,801,747 | * 9/1998 | Bedard | 348/1 |
| 5,801,787 | * 9/1998 | Schein et al. | 348/589 |
| 5,867,226 | * 2/1999 | Wehmeyer et al. | 348/10 |
| 6,020,880 | * 2/2000 | Naimpally | 348/906 |

FOREIGN PATENT DOCUMENTS

| | | |
|---|---|---|
| 721253A2 | 7/1996 | (EP) . |
| 774866A2 | 5/1997 | (EP) . |
| WO 83/02208 | 2/1982 | (WO) . |
| WO95/01057 | 1/1995 | (WO) . |
| WO96/31980 | 10/1996 | (WO) . |
| WO98/12875 | 3/1998 | (WO) . |

OTHER PUBLICATIONS

"PBS Enterprises" press release, Sep. 11, 1990.*

* cited by examiner

Primary Examiner—David E. Harvey
(74) Attorney, Agent, or Firm—Finnegan, Henderson, Farabow, Garrett & Dunner, L.L.P.

(57) ABSTRACT

A personal editing apparatus and method allowing a user to enter program selection criteria and based on those criteria, and received extended data, display personalized programming information to the user.

68 Claims, 16 Drawing Sheets

| HEX CODE | DESCRIPTIVE KEYWORD | HEX CODE | DESCRIPTIVE KEYWORD | HEX CODE | DESCRIPTIVE KEYWORD |
|---|---|---|---|---|---|
| 20 | EDUCATION | 40 | FANTASY | 60 | MUSIC |
| 21 | ENTERTAINMENT | 41 | FARM | 61 | MYSTERY |
| 22 | MOVIE | 42 | FASHION | 62 | NATIONAL |
| 23 | NEWS | 43 | FICTION | 63 | NATURE |
| 24 | RELIGIOUS | 44 | FOOD | 64 | POLICE |
| 25 | SPORTS | 45 | FOOTBALL | 65 | POLITICS |
| 26 | OTHER | 46 | FOREIGN | 66 | PREMIERE |
| 27 | ACTION | 47 | FUND RAISER | 67 | PRERECORDED |
| 28 | ADVERTISEMENT | 48 | GAME/QUIZ | 68 | PRODUCT |
| 29 | ANIMATED | 49 | GARDEN | 69 | PROFESSIONAL |
| 2A | ANTHOLOGY | 4A | GOLF | 6A | PUBLIC |
| 2B | AUTOMOBILE | 4B | GOVERNMENT | 6B | RACING |
| 2C | AWARDS | 4C | HEALTH | 6C | READING |
| 2D | BASEBALL | 4D | HIGH SCHOOL | 6D | REPAIR |
| 2E | BASKETBALL | 4E | HISTORY | 6E | REPEAT |
| 2F | BULLETIN | 4F | HOBBY | 6F | REVIEW |
| 30 | BUSINESS | 50 | HOCKEY | 70 | ROMANCE |
| 31 | CLASSICAL | 51 | HOME | 71 | SCIENCE |
| 32 | COLLEGE | 52 | HORROR | 72 | SERIES |
| 33 | COMBAT | 53 | INFORMATION | 73 | SERVICE |
| 34 | COMEDY | 54 | INSTRUCTION | 74 | SHOPPING |
| 35 | COMMENTARY | 55 | INTERNATIONAL | 75 | SOAP OPERA |
| 36 | CONCERT | 56 | INTERVIEW | 76 | SPECIAL |
| 37 | CONSUMER | 57 | LANGUAGE | 77 | SUSPENSE |
| 38 | CONTEMPORARY | 58 | LEGAL | 78 | TALK |
| 39 | CRIME | 59 | LIVE | 79 | TECHNICAL |
| 3A | DANCE | 5A | LOCAL | 7A | TENNIS |
| 3B | DOCUMENTARY | 5B | MATH | 7B | TRAVEL |
| 3C | DRAMA | 5C | MEDICAL | 7C | VARIETY |
| 3D | ELEMENTARY | 5D | MEETING | 7D | VIDEO |
| 3E | EROTICA | 5E | MILITARY | 7E | WEATHER |
| 3F | EXERCISE | 5F | MINISERIES | 7F | WESTERN |

*FIG. 5*

PERSONAL EDITING SYSTEM

BACKGROUND OF THE INVENTION

The present invention relates generally to a personal information system and a method for obtaining personalized information regarding television programming.

With the advent of cable, satellite, and other systems providing television viewers with a large number of television channels to choose from, often in excess of 150, "channel surfing" is a widely practiced activity. While "surfing," viewers look at small segments of programs to determine their desirability, often looking at many program segments until finding a suitable program. To compound the problem of choosing among the vast amount of available programming, the viewer must also view commercials and wait for them to end to determine the content or the type of program on that channel.

Often, the time spent channel surfing causes the viewer to begin viewing a desired program several minutes into the show, which is not the most desirable circumstance. Thus, it would be advantageous for the viewer to be able to minimize the time required to find the type of programming he wants to watch, including categories of programming such as drama, music, history, etc.

Conventional systems blank the reception of television shows based on the content of the received programming. U.S. Pat. No. 4,554,584 issued to Elam et al. discloses a video and audio blanking system. In Elam et al., a selector at the television receiver controls the content of programming which may be viewed or heard using a rating system. The ratings may be the well-known "G", "PG", and "R" ratings typically used for movies. According to Elam et al., a television user can select a rating level and whenever programming having that level or a higher level is received, the receiver will blank the audio or video signals or both.

Although the television editing system disclosed in Elam et al. is useful to blank incoming signals based on the content and type of program, it would be advantageous for the television to also assist the viewer in selecting programs of the desired type.

PCT application number PCT/GB82/00352 of Chard discloses active or passive editing and selection of television programming that can depend on the type or content of the programming. Chard discloses active program type selection using continuous cyclic sampling of the received channels to find a program meeting the selected type criteria. Chard discloses an "active selection" scheme for finding a desired program in which the system automatically scans the channel controls for a program of the desired "type". For "passive selection," the viewer manually scans the channels and the system blanks all programs of types not desired, so the viewer only accesses channels with desired types of programs.

Thus, though Chard performs editing based on program type, the Chard system does not provide a summary or listing of all suitable programming that meets the viewer's selection criteria. Additionally, in both active and passive editing, the Chard system selects only one channel for viewing without informing the viewer of equally suitable alternate channels or programs.

Conventional systems also provide a scrolling program guide to viewers, showing, for example, in one-half hour increments what is available on every channel that the programming provider provides, even if the viewer does not subscribe to the programming for all channels. While such program guides provide valuable information to viewers, they cannot be modified. For example, a viewer cannot set parameters for the type and time frame of desired programming information, so the conventional program guides generally provide too much information and are often not particularly helpful in allowing the viewer to focus on programming of a desired type.

It is therefore a primary desire of the present invention to provide a system and method for controlling the channels or programs that a television receiver displays for viewing, based on the program type. The system and method should also provide a display listing all available programming of the type desired.

Another desire of the present invention is to provide a personal television editing system in which viewers can select whether or not to receive specific types of programming.

Other desires of the present invention are to provide a method of automatically selectively editing the type of programming that a viewer can watch, to effect control of the television display and sound automatically, and to provide a system and method for effecting such automatic control according to the selection of several different program content designations or codes.

A further desire of the present invention to provide a personal television editing system and method that allow a television viewer to reduce the number of channels that must be searched by actual viewing to find the desired program in which the viewer has an interest.

Additional objectives, features, and advantages of the invention will be set forth in the description which follows, and in part will be apparent from the description, or may be learned by practice of the invention. The objectives and other advantages of the invention will be realized and attained by means of the instrumentalities and combinations particularly pointed out in the written description and appended claims hereof, as well as the appended drawings.

SUMMARY OF THE INVENTION

To achieve these and other advantages and in accordance with the purposes of the invention, as embodied and broadly described, the television editing apparatus consistent with this invention comprises an input device for receiving and buffering externally provided television programming information, a data sorter for extracting and sorting extended data associated with the input television programming information, memory means for separately storing the extended data, a user control for inputting television programming criteria to identify programming, and a display controller, coupled to the memory means, for controlling display of personalized information about television programming based on the stored extended data and the television programming criteria.

Also consistent with the present invention the television editing apparatus comprises an input device for receiving and buffering externally provided television programming information, a user control for inputting television programming criteria to identify programming, a program history library for storing information related to viewing habits of a user of the television editing apparatus based on the input television programming criteria, and a display controller, coupled to the memory means, for controlling display of personalized information about television programming based on the stored information in the program history library.

A method of editing program displays consistent with this invention comprises causing a television receiver to acquire extended data from received television programming, entering program parameters identifying desired programming, building a list of program information based on the extended data and the desired program parameters, and displaying the list of program information.

Further, a method of editing program displays consistent with this invention comprises receiving and buffering externally provided television programming information, inputting television programming criteria to identify programming, storing information in a program history library related to viewing habits of a user based on the input television programming criteria, and controlling display of personalized information about television programming based on the stored information in the program history library.

Both the foregoing general description and the following detailed description provide descriptions of embodiments and provide further explanation of the invention as claimed. The descriptions are not intended to limit the scope of the claims.

BRIEF DESCRIPTION OF THE DRAWINGS

The accompanying drawings, which are incorporated in and constitute a part of the specification, illustrate presently preferred implementations consistent with the invention and, together with the general description given above and the detailed description of the preferred implementations given below, explain the principles of the invention.

In the Drawings:

FIG. 5 is an exemplary table of descriptive keywords and the associated codes used to categorize television programming.

DETAILED DESCRIPTION OF THE INVENTION

Reference will now be made in detail to the construction and operation of preferred implementations of the present invention, which are illustrated in the accompanying drawings. In those drawings, like elements and operations are designated with the same reference numbers.

Figure 1:
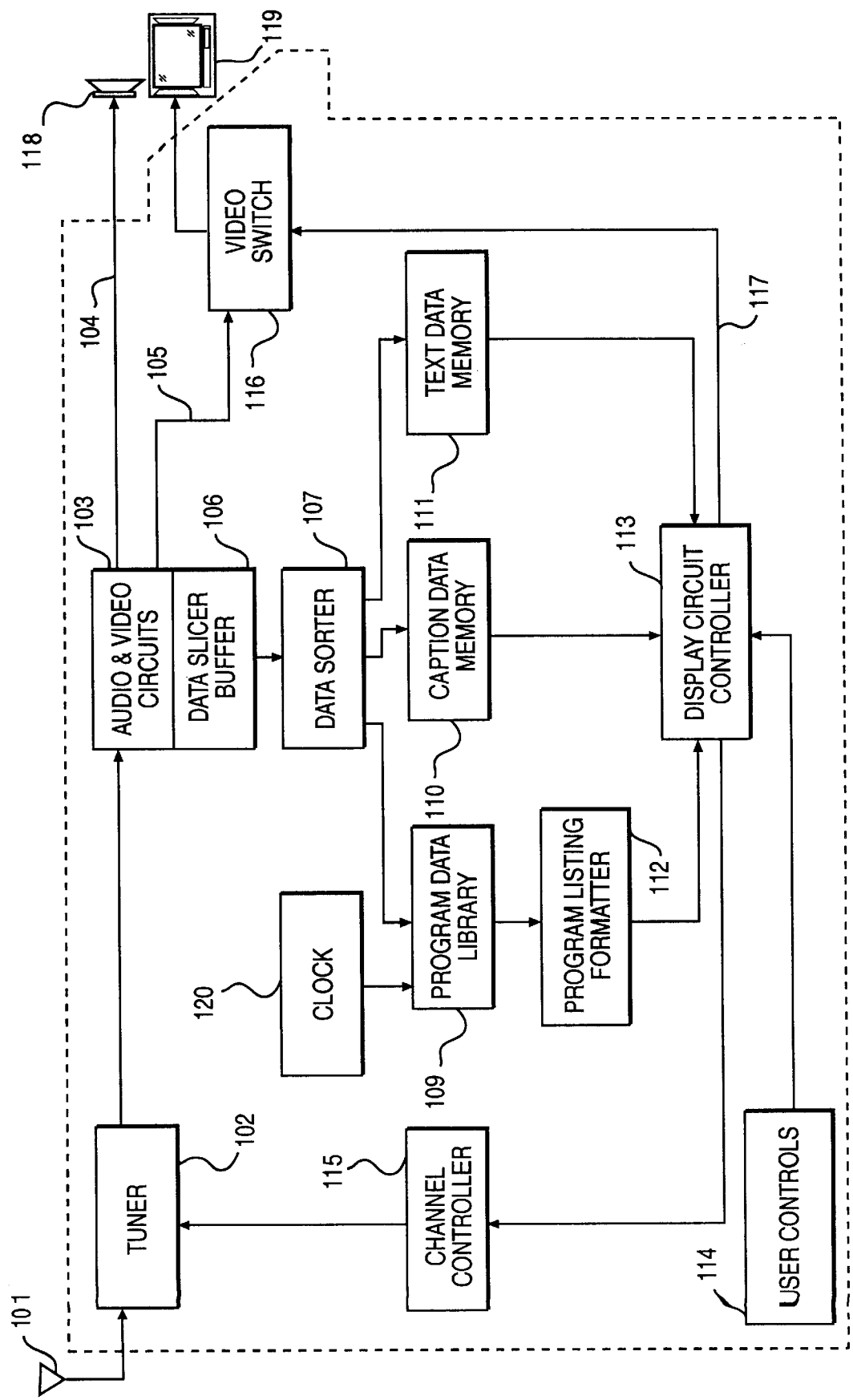
FIG. 1 is a block diagram of a personal television editing system consistent with the present invention.

FIG. 1 is a block diagram of a personal television editing system 100 consistent with the present invention. Personal editing system 100 can be part of a television receiver or can be constructed as a retrofit apparatus. As shown in FIG. 1, a tuner 102 receives RF transmissions from antenna 101. Tuner 102 could also receive input signals from a cable or a direct broadcast satellite (DBS) or any other suitable device that transmits television signals. Tuner 102 may be a conventional television tuner and is coupled to audio and video circuits 103. The audio signals are output from the audio and video circuits 103 on audio line 104, while the video signals are output on video line 105. The video signals are output to a video switch 116, which outputs signals to a signal receiver 119, while the audio signals are output to a speaker 118.

The video circuits of the audio and video circuits 103 are preferably connected to a data slicer/buffer 106, which extracts information about the programming received by the tuner 102. In the case of a digital television system, a microprocessor and interconnecting data bus would be used in lieu of the video circuits. The extracted information may include, for example, extended data for the current program in accordance with current EIA standards. The extended data may also include current class in-band and out-of-band, future class in-band and out-of-band, and channel information class and can include data regarding current programs on other channels and future programs on the same and other channels. The extended data may include information regarding the program name, any title associated with the program, date and time of the program, channel number, the program content rating, and the program type. A real time clock 120, connected to program data library 109, enables the personal editing system to determine whether information stored in the program data library is pertinent to the present viewing time and date. In a digital television system data containing information as extended data would be extracted by the microprocessor and interconnecting data bus. It is noted that the extended data associated with the received television programming can be received as a part of the programming or separately therefrom, as described in greater detail below.

The information is extracted in the data slicer/buffer 106 and then passed to data sorter 107. The data sorter 107 sorts the extracted data and outputs program data to a program data library 109, caption data to caption data memory 110, and text data to text data memory 111. The data sorter operates using the EIA class codes assigned to the extended data. The class codes earmark the data with respect to its purpose, for example, program name. Data sent to the program data library 109 includes program name or title, time of the program, date of the program, channel number, and program category or type. Data sent to caption data memory 111D includes, for example, captioning text for screen display, and data sent to text data memory 111 includes text data for screen display.

A viewer preferably activates and controls the personal editing system 100 via the user controls 114. User controls 114 may be an infrared remote, a data entry mechanism, such as a keyboard or a card reader, or any other suitable type of of information input mechanism, such as a scanner, a magnetic disc reader, and a memory recording device. Through the user controls 114, the viewer can enter information to identify a desired type of programming. The viewer can also use user controls 114 to enter information to identify the type of programming not desired. The viewer enters such program information based on different parameters. Viewer selection of desired parameters is discussed in greater detail with respect to FIGS. 2(a) through 2(d).

The user selections entered via user controls 114 are sent to the display circuit controller 113, which is a microprocessor or microcontroller of the type designed for processing and displaying extended data, captioning data, and text data within television receivers. The user control selections activate the display circuit controller 113 to display the desired personal editing display screens. These displays preferably provide displays of currently available and future programs of the types chosen by the viewer or other types not eliminated by the viewer. From these display screens, the viewer can, by using cursor movement for example, command the receiver or adapter box to tune the television to a desired channel or program.

Program data library 109 acquires data in its database by constantly monitoring the extended data present on the channel to which the television receiver is tuned. Library 109 is preferably a RAM containing the program information that display circuit controller 113 displays on the screen. Program data library 109 sends this information to program listing formatter 112, which formats the data for display on the screen.

The formatted data is sent to display circuit controller 113, which may also receive caption data and text data respectively from caption data memory 110 and text data memory 111. Display circuit controller 113 can be used to display only caption data from caption data memory 110 and text data from text data memory 111. Display information from program data library 109, caption data memory 110, or text data memory 111, is sent from the display circuit controller 113 along video line 117 to video switch 116.

A composite signal is then sent to the screen. Preferably, when the personal editing system 100 displays data, it replaces the current program picture with the personal editing system display, and mutes the sound. Alternatively, system 100 can display the current program picture and the personal editing system display at the same time, for example, the personal editing system display being within a picture-in-picture box on the display screen. The display output to the receiver may include a chart listing the programming available, both in the present and future, consistent with the criteria input at the user controls 114.

Figure 2A:
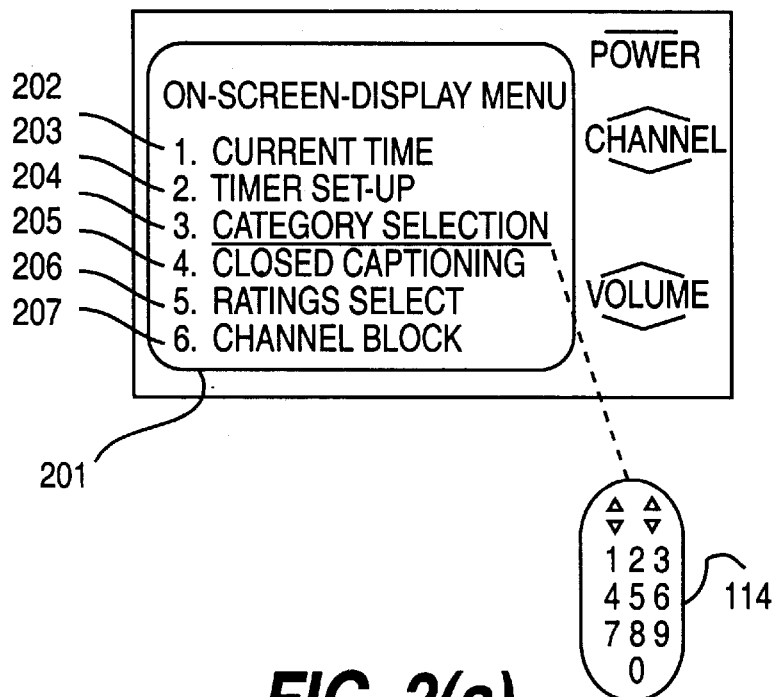
FIGS. 2(a)–2(d) are exemplary television screens that may appear using the personal television editing system of FIG. 1.

FIGS. 2(a)–2(d) are exemplary television screens that may appear when a user enters information into the personal editing system 100. As shown in FIG. 2(a), when the user activates user controls 114, shown in FIG. 2(a) as a remote control, on-screen display menu 201 appears. This menu preferably includes various options 202–207 that can be selected by the viewer. The options shown in FIG. 2(a) are not exhaustive and can be changed as desired. By selecting option 202, the user can have the current time and date displayed. The time and date can be set and modified by selecting option 203. By selecting option 204, the viewer can enter the categories or types of programming to receive or block. A detailed description of option 204 is explained with respect to FIGS. 2(b) through 2(d).

The viewer can elect to receive closed captioning by selecting option 205, and can select whether to receive programming with certain ratings in option 206. The ratings that can be selected in option 206 may correspond to the Motion Picture Association of America ratings of "G", "PG", "PG-13", "R" and "X", or can be another rating scheme. The viewer can select whether to receive programming that has, for example a rating of PG or lower. By selecting option 207, the viewer can elect to block the reception of certain channels altogether.

Figure 2B:
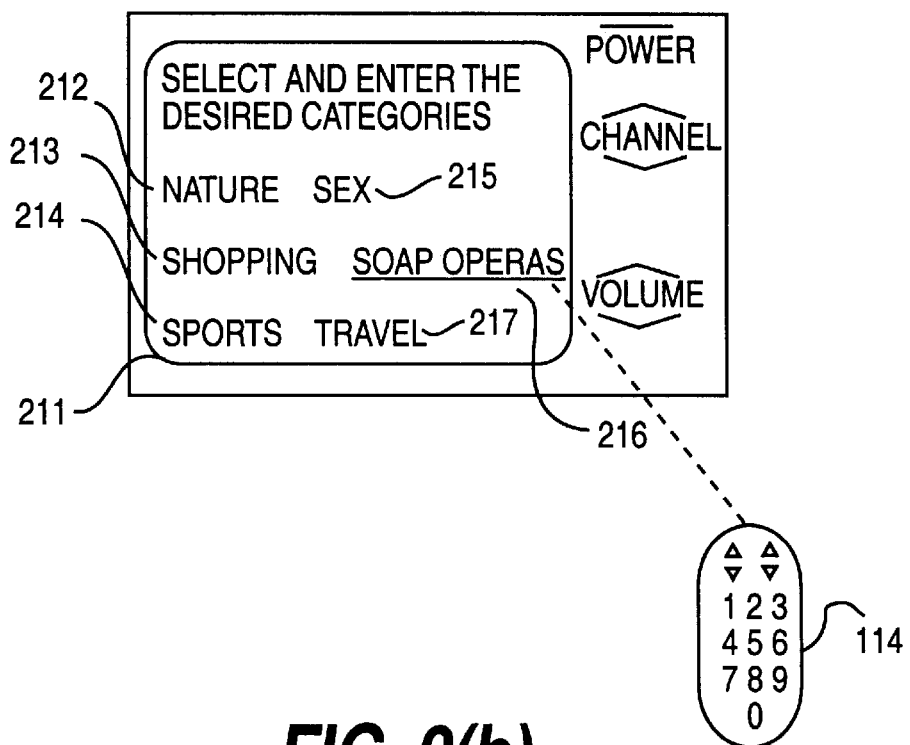

As shown in FIG. 2(a), user control 114 is shown as selecting option 204. FIG. 2(b) shows a representative menu 211 that may be displayed upon selection of option 204. The viewer is prompted to select and enter from the categories 212–217. The categories need not be limited to one screen, and the viewer can scroll to multiple screens if necessary in the selection process. As shown in FIG. 2(b), the viewer has selected category 216, soap operas.

Figure 2C:
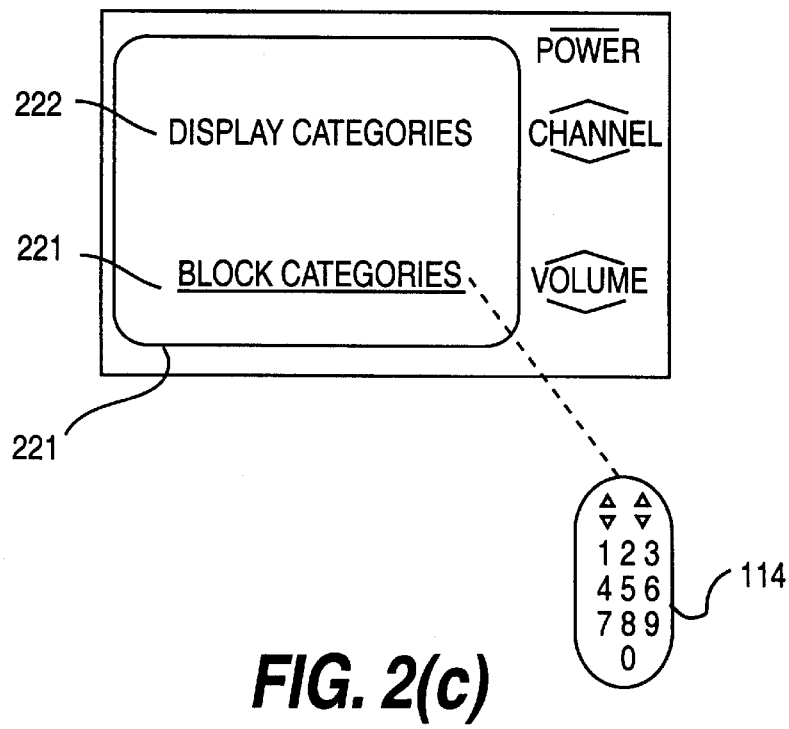

After category selection, the user is prompted by the display/block screen 221, shown in FIG. 2(c). The user can elect to display the selected categories by selecting option 222 or can elect to block the selected categories by selecting option 223. Note that multiple selections may be made.

Figure 2D:
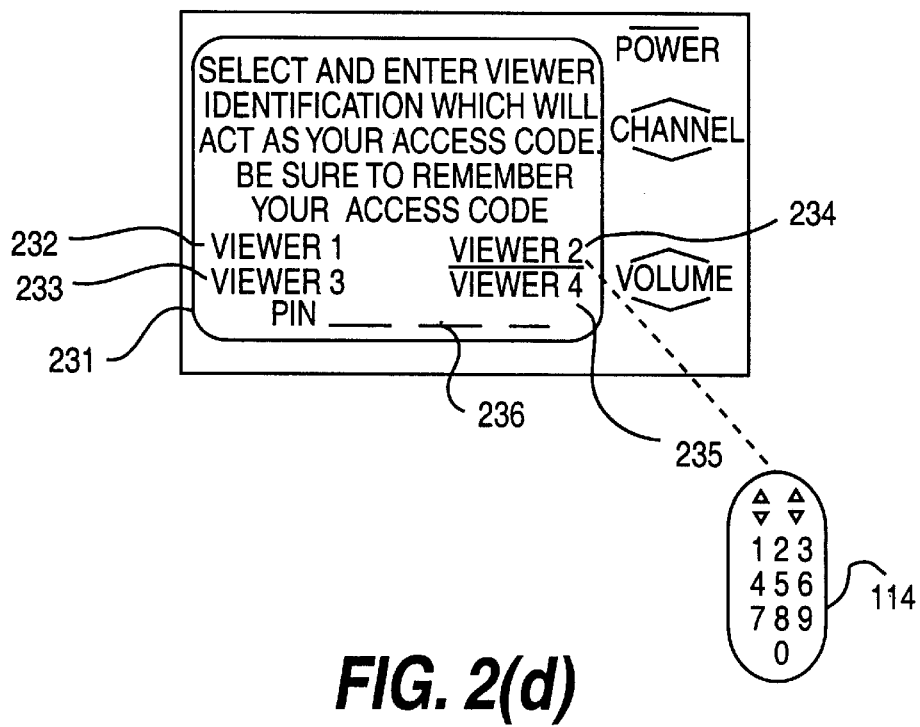

After making a selection from the display/block screen 221, the user sees an identification screen 231, shown in FIG. 2(d). This screen is optional and not required to perform the personal editing of the present invention. In the identification screen 231, the user can identify himself as one of several viewers 232–235 registered with system 100. The user may be required to enter a password or personal identification number (PIN) in PIN option 236. The password or PIN enables multiple viewers to enter and store program category selections. The PIN can be entered using the user control 114 or with another data entry device.

Identification screen 231 allows personal editing in different ways for different viewers. One or more of the viewers may also have control over certain of the viewing choices of other of the viewers. For example, the system according to the present invention can be configured such that if viewer 1 sets a certain channel to be blocked, none of the other viewers can receive programming from that channel. The channel blocking would be achieved by the display circuit controller 113, inhibiting the channel controller 115 from selecting those channels and associated programs. After making the selections, as shown in FIGS. 2(a) through 2(d), personal editing system 100 is configured to display only the programming meeting the criteria selected, such as the type of programming, the time the programming is transmitted, or the content designation of the programming.

After receiving the personal identification parameters (FIG. 2(d)), program data library 109 and the program listing formatter 112 of FIG. 1 assemble a display screen of program information that meets the corresponding criteria. A graphical representation of that information may be displayed to the viewer. The graphical representation may include information about both current and future programming, and can be selected, for example, from a menu selection on the television. The information about future programming is compiled from the extended data "future class" as set in the current EIA standards.

Figure 3:
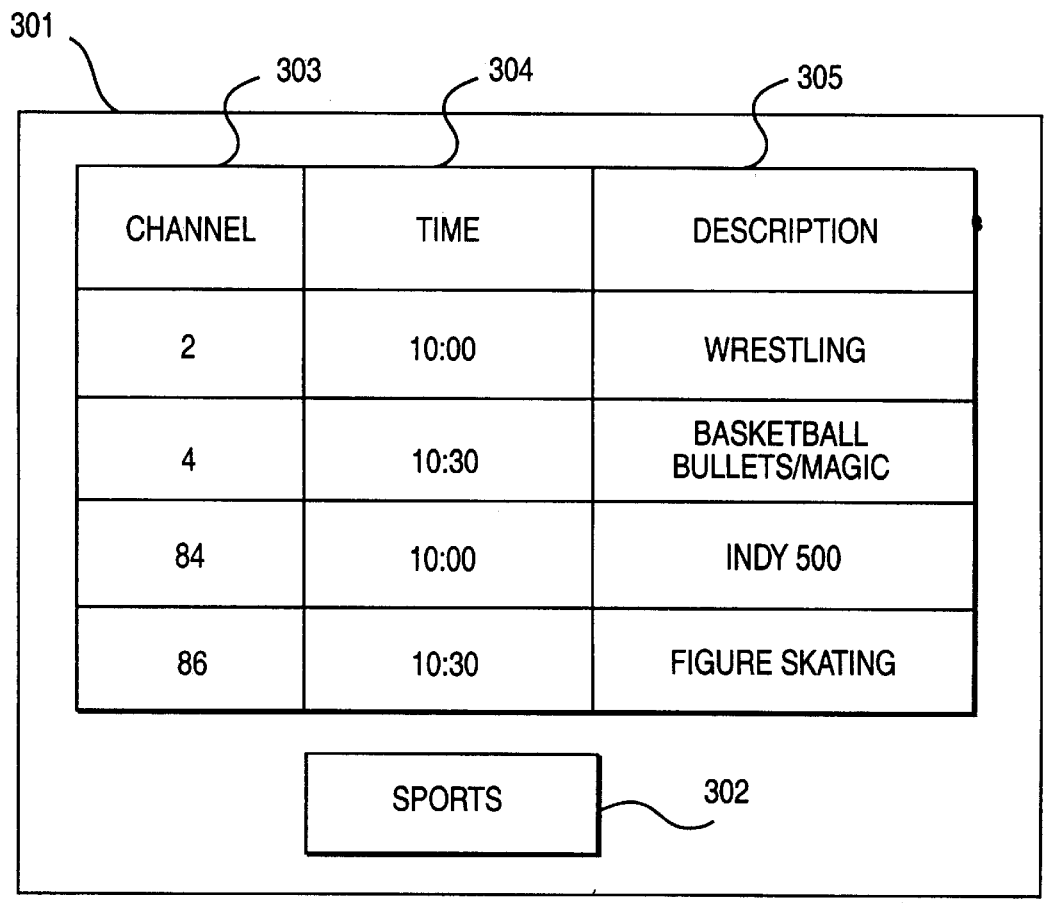
FIG. 3 shows a screen of exemplary program information compiled according to the criteria set in FIGS. 2(a) through 2(d).

FIG. 3 shows a screen of exemplary program information compiled according to the criteria set in FIGS. 2(a) through 2(d). Program information screen 301 can, for example, display information regarding the programming of a particular type that is currently being or will be transmitted. As shown in FIG. 3, the category 302 is sports, and the program information screen can provide information regarding the channel 303, the time the program started or will start 304, as well as a description of the programming 305. Using control 114, the viewer can select one of the options from the program information screen 301, and the tuner 102, shown in FIG. 1, will be set to receive the selected channel.

Screen 301 may include choices to go to a specific selection or scan all of the programs. If scanning is selected, each of the selections or some predetermined subset, may be automatically viewed for approximately ten seconds. Then the screen returns to the information screen 301.

Figure 4:
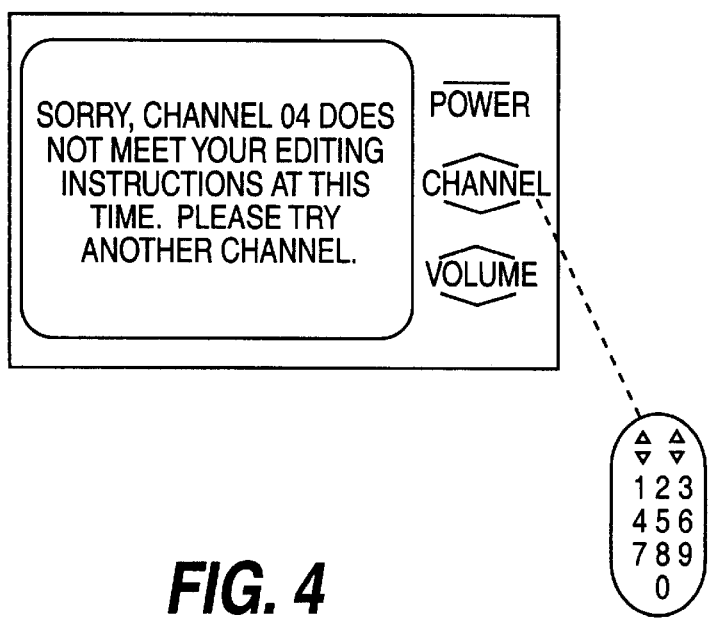
FIG. 4 shows a non-criteria screen that may appear using the personal editing system of FIG. 1.

If the viewer manually enters a program type selection that does not meet the input selection criteria, a screen such as that shown in FIG. 4 may appear. The "non-criteria" screen 401 preferably includes a message advising the viewer that the channel selected does not meet the editing instructions. When the viewer operates the user control 114 (FIG. 1), to select a channel that is not an allowed option, the display circuit controller 113 will inhibit the transfer of that selection.

Alternatively, manual input of a channel number via user control 114 can override selected ones of the editing instructions. This would allow manual entering of a channel number to override the category criteria, but not rating or channel blocking criteria.

With reference to FIG. 1, when the viewer operates the user controls 114 and selects a channel that differs from the categories (program type) selected, but agrees with the content rating, and which is not otherwise channel blocked, the display circuit controller 113 will compare the channel number or content rating with those specified by the viewer in FIGS. 2(a) through 2(d). If there are no conflicts, the display circuit controller 113 will pass the channel request to the channel controller 115 for execution. The channel controller 115 will command the tuner 102 to then change to the selected channel.

As described above with respect to FIGS. 2(a) through 2(d), personal editing choices can be made with regard to categories (program types) of programming. FIG. 5 shows table 501 that illustrates descriptive keywords and their associated codes. Preferably, the service provider, such as a cable provider, or the program producer, specifies using extended data codewords, all descriptive keywords that apply to a program. The corresponding code is then transmitted with the programming as extended data. In this manner, when a viewer enters one or more category or program type selections, system 100 compares the selections with the code associated with the incoming programming to determine whether the program meets the selection criteria.

Figure 6:
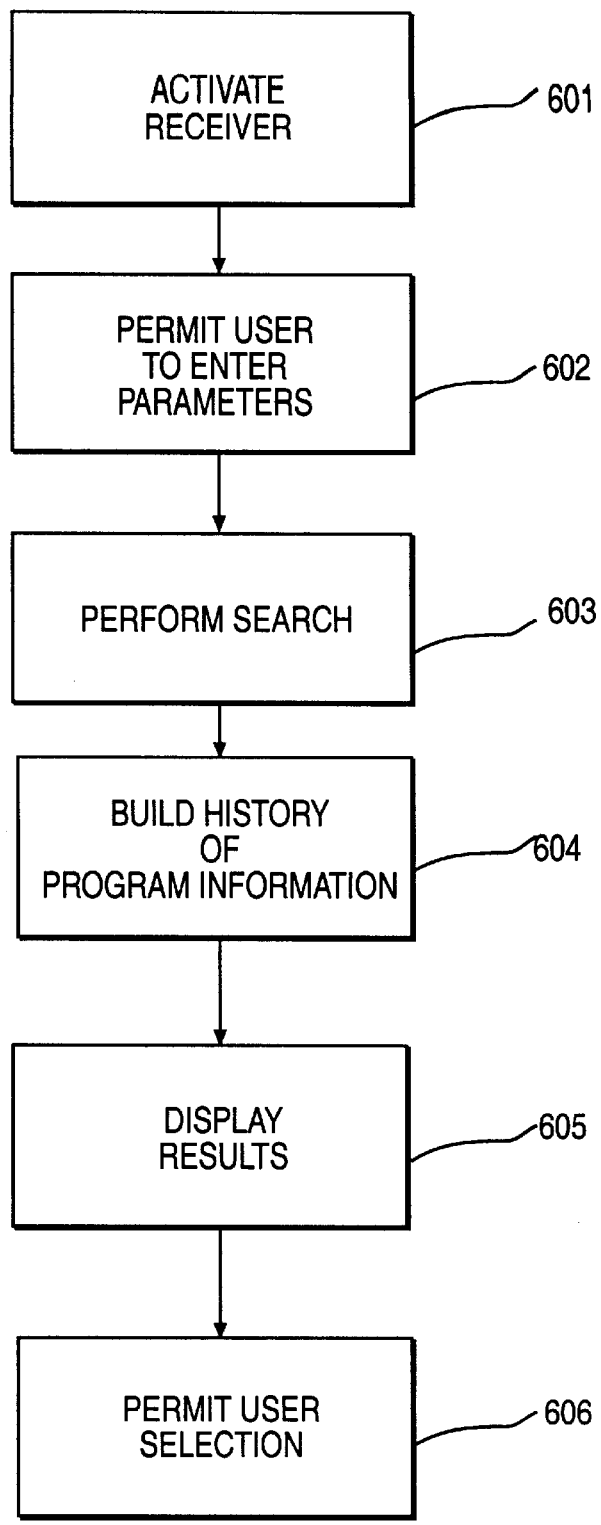
FIG. 6 is a flow diagram illustrating the personal editing process consistent with the present invention.

FIG. 6 is a flow diagram illustrating a personal editing process consistent with the present invention. First, the receiver is activated (step 601) and the personal editing system acquires, extended data from received programming. The extended data provides information about current and future programs for the received channel and other channels. Then, as described in greater detail with respect to FIGS. 2(a) through 2(d), the personal editing system allows the viewer to select desired program parameters (step 602). After the program parameters are entered, personal editing system 100 searches library data (step 603) and builds a list of program information according to the selection criteria (step 604). After the program list is constructed, the results are sent to the user (step 605). The output to the user can be simply a listing of programs or can be a graphical display. Then the user can enter a selection based on the displayed program information (step 606).

In addition, personal editing system 100 can compile a history of programs viewed, thereby giving trends regarding which channels and at what times desired programs will most likely be available based upon past viewing habits. The contents of this history are preferably displayed in a manner similar to the program information screen shown in FIG. 3, allowing the viewer to make a specific selection.

Figure 7A:
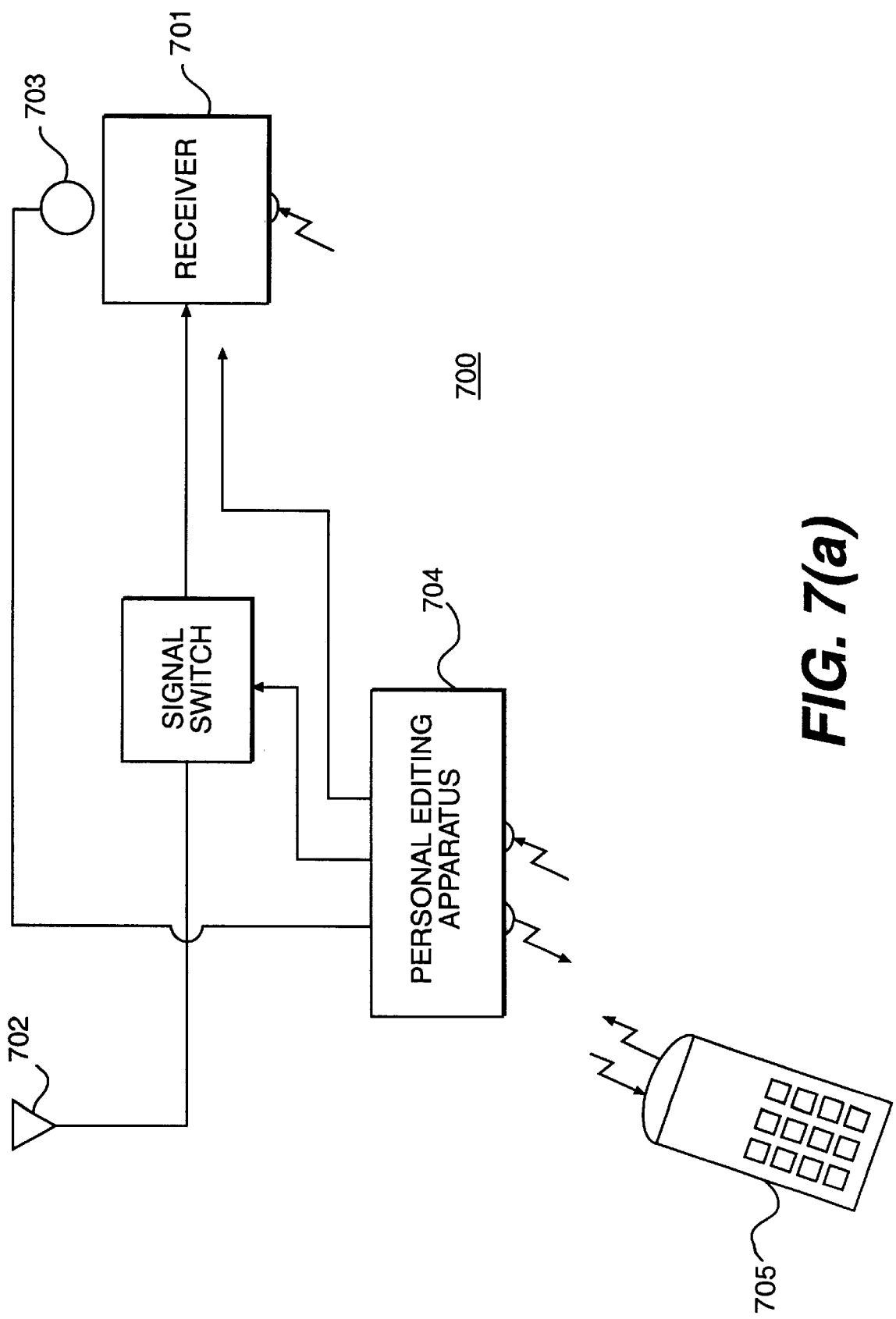
FIGS. 7(a) and 7(b) are block diagrams of a second personal editing system consistent with the present invention.
Figure 7B:
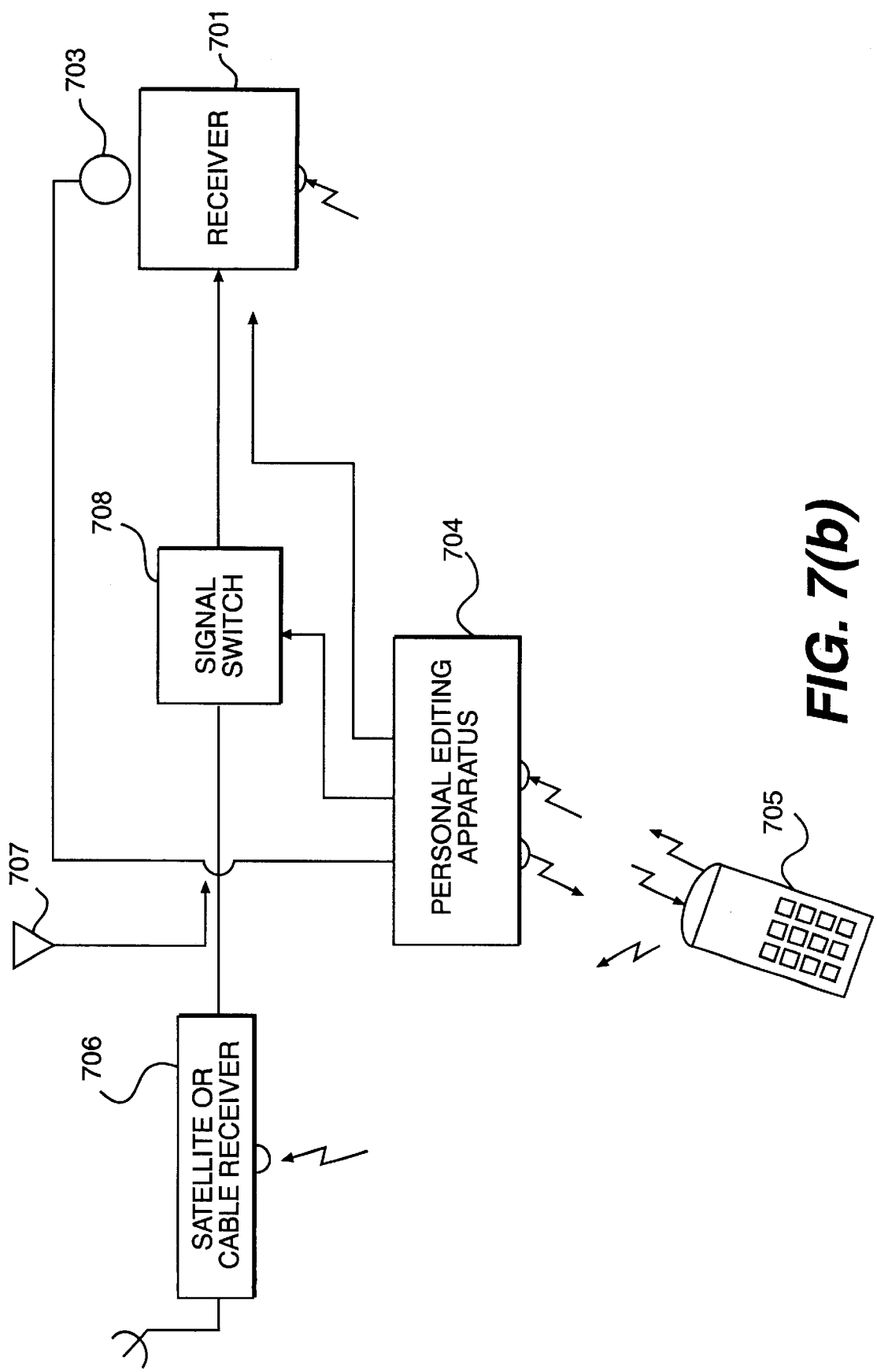

FIG. 7(a) is a block diagram of a second personal editing system 700 consistent with the present invention. System 700 differs from system 100 (FIG. 1) in its use of an IF probe 703 to detect program channel and other information. As shown in FIG. 7(a), a receiver 701, such as a television receiver, receives RF transmissions from an antenna 702. Alternatively, receiver 701 can receive input signals from a cable or a direct broadcast satellite or any other suitable device used for transmission of television programming, as shown in FIG. 7(b). Receiver 701 tunes to the RF transmissions using conventional tuners and produces an intermediate frequency (IF) signal for further amplification and filtering.

IF probe 703 may be an inductive probe and is coupled to the receiver 701 and is mounted on or within the television cabinet in an area that provides maximum pickup of the IF signals from the receiver 701. The IF probe 703 detects a small portion of the IF signal, and after amplifying the IF signal, performs an amplitude detection to detect the video signal. The detected video signal is routed to the personal editing apparatus 704 for digital data extraction. The personal editing apparatus 704, shown in FIGS. 7(a) and 7(b) is external to the television and is constructed as a retrofit device. System 700 has functions similar to that described above with respect to the first embodiment.

As shown in FIG. 7(a), the personal editing apparatus is used with a remote control 705. Remote control 705 preferably communicates with the personal editing apparatus using infrared signals, for example, whenever entering viewer preferences via cursor movements. Additionally, the remote control 705 sends and receives commands with respect to specific channel numbers rather than as an "up or down" command. This is done because after personal editing instructions are entered, for example blocking particular channels, use of the "up" and "down" commands may be ambiguous. By issuing specific channel numbers the personal editing apparatus and the television know the specific channel number selected. To accommodate this feature, the remote control 705 has a memory device for storing the last channel number selected and includes a transceiver for relaying signals between the personal editing apparatus and the television.

To improve the signal quality of the video display screen, a signal switch 708 may be installed between local antenna 702 and receiver 701 to block reception of any incoming signals that might degrade the output on the video display screen. Signal switch 708 also provides a means for inhibiting the display of blocked channels. In addition, signal switch 708 insures that there is no interference between received programming and a signal output from a circuit such as display circuit controller 113, shown in FIG. 1.

FIG. 7(b) is a block diagram of an alternate configuration of system 700. As shown in FIG. 7(b), input programming can be received by a satellite or cable receiver 706 and a local antenna 707. As also shown in FIG. 7(b), the remote control 705 can be used to control each of the satellite or cable receiver 706, the personal editing apparatus 704, and the receiver 701. Similar to the configuration shown in FIG. 7(a), a signal switch 708 may be installed between local antenna 709, satellite or cable receiver 706 and the receiver 701.

Figure 8:
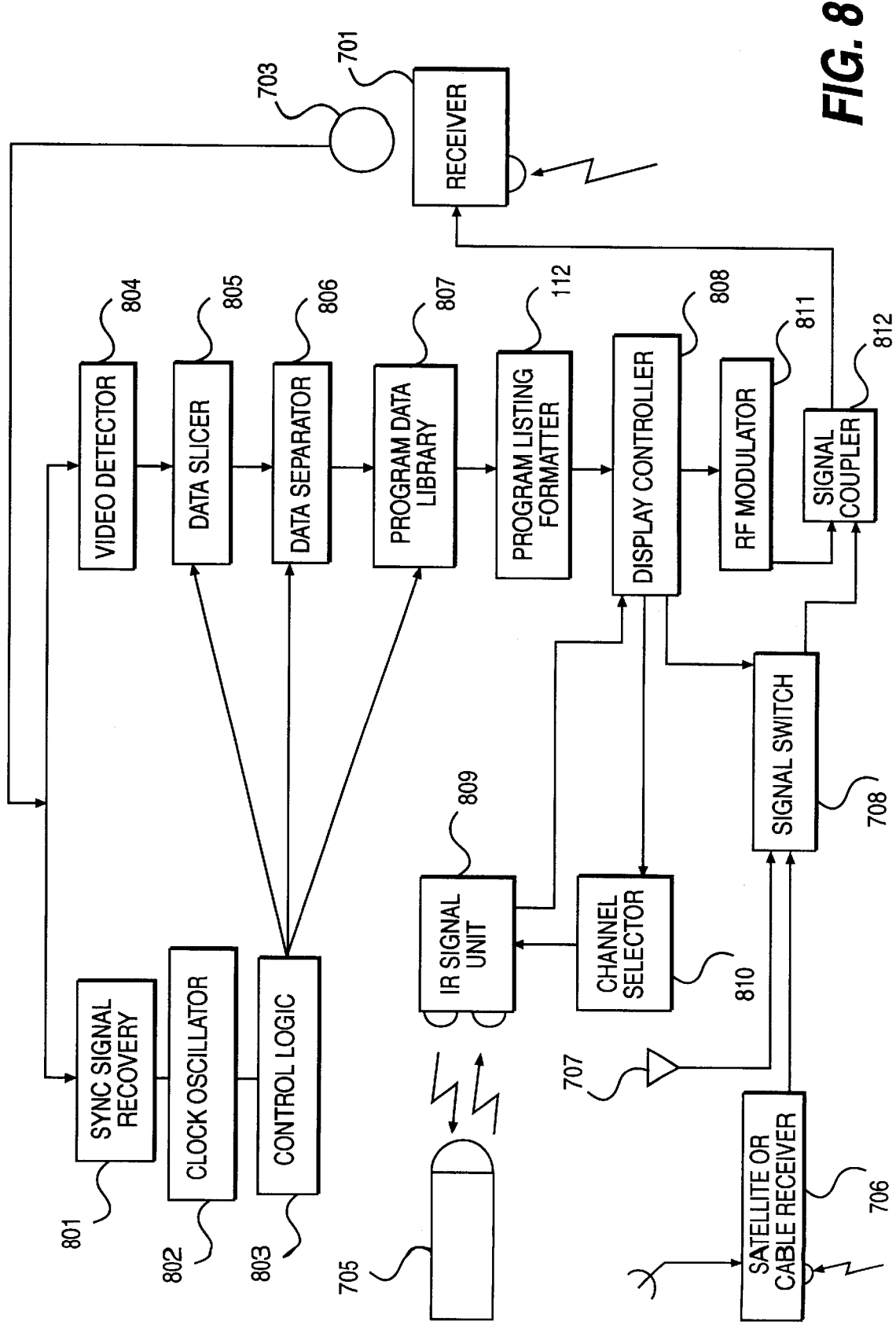
FIG. 8 is a block diagram of the personal editing apparatus shown in FIG. 7(b).

FIG. 8 is a block diagram of personal editing apparatus 704 shown in FIG. 7(b). The signal from IF probe 703 is passed to sync signal recovery circuit 801, which performs an amplitude detection on the video signal to detect the vertical and horizontal synchronization waveforms. These waveforms synchronize the clock oscillator 802 so control logic 803 can locate the appropriate video data line and field, for example, line 21 of field 2, to extract extended data.

The IF signal from IF probe 703 is also input to video detector 804 where it is amplitude detected to recover the composite video signal. The detected video waveform is then sent to data slicer 805 where the video waveform is converted to digital signals of standard logic levels. Data separator 806 extracts the data bits from the video signal by sampling the signal at the precise time the desired data is present. For example, the extended data may be extracted from line 21 of picture field 2. In addition, data separator 806, similar to data sorter 107 (FIG. 1), differentiates between the various digital data items received and identifies and selects only those data items of interest and routes them to the program data library 807. With program data library 807, preferably only program information such as channel time, category, and title data is routed; caption data is ignored.

The data in the program data library 807 is sent to program listing formatter 112 (FIG. 1) and then to display controller 808. Display controller 808 can be used to display the results of the personal editing instructions input via remote control 705 and received via IR signal unit 809 and to display the personal editing selection screens exemplified in FIGS. 2(a) to 2(d). Display controller 808 interfaces with RF modulator 811 to sent the appropriate signals to receiver 701.

Preferably, whenever the viewer wishes to access the personal editing apparatus program guide, a special remote control 705 will be used. Remote control 705 communicates with the IR signal unit 809, which in turn communicates viewer commands to display controller 808. Display controller 808 accesses the required data from program data library 807 and constructs a video display screen, which is, in turn sent to RF modulator 811. RF modulator 811 outputs an RF signal with the video display thereon. The RF signal will be preset to use channel 2, 3, 4, or some other unused channel. When RF modulator 811 is used, display controller 808 operates signal switch 708 to block incoming signals from antenna 707 and satellite or cable receivers 706.

Display controller 808 sends a channel command for the preset channel through the channel selector 810, to IR signal unit 809. IR signal unit 809 will, in turn, send the channel command to the remote control 705, which repeats the signal back to receiver 701. Receiver 701 will thus be tuned to receive the video display from the RF modulator 811 on the preset channel.

The viewer can select the desired on-screen-displays, shown in FIGS. 2(a) through 2(d), in the same manner as described with respect to the first embodiment. These displays allow the viewer to establish various program editing criteria and select specific channels to be viewed based upon the choices offered as illustrated in FIG. 3. In making these selections, the viewer will use remote control 705, which sends IR signals to the personal editing apparatus 704. Using personal editing apparatus 704 a cursor can be moved within the various screens, such as those shown in FIGS. 2(a)–2(d), to change screens and menus and execute channel selection commands from the remote control 705. Because personal editing apparatus 704 does not directly change the channel going into the receiver 701, it must indirectly change the television channel to the desired program by sending an IR signal to the remote control 705, remote control 705 repeats or relays the signal or channel command signal to the receiver 701, as shown in FIG. 7(a). If the system shown in FIG. 7(b) is used, the remote control 705 repeats or relays the signal or channel command to the satellite or cable receiver 706. In this manner the personal editing apparatus; 704 has the same features as system 100.

Remote control 705 is preferably designed such that when sending a channel command, the channel number is always transmitted, even when the viewer presses the channel "increment-up" or "decrement-down" buttons. This requires the remote control 705 to store in memory the last channel transmitted. This feature insures that the personal editing apparatus 704 always knows exactly which channel the receiver 701 or satellite/cable receiver 706 have been commanded to receive by the remote control 705. This feature is particularly important for the personal editing apparatus when compiling data for a history of programs or channels viewed.

Figure 9:
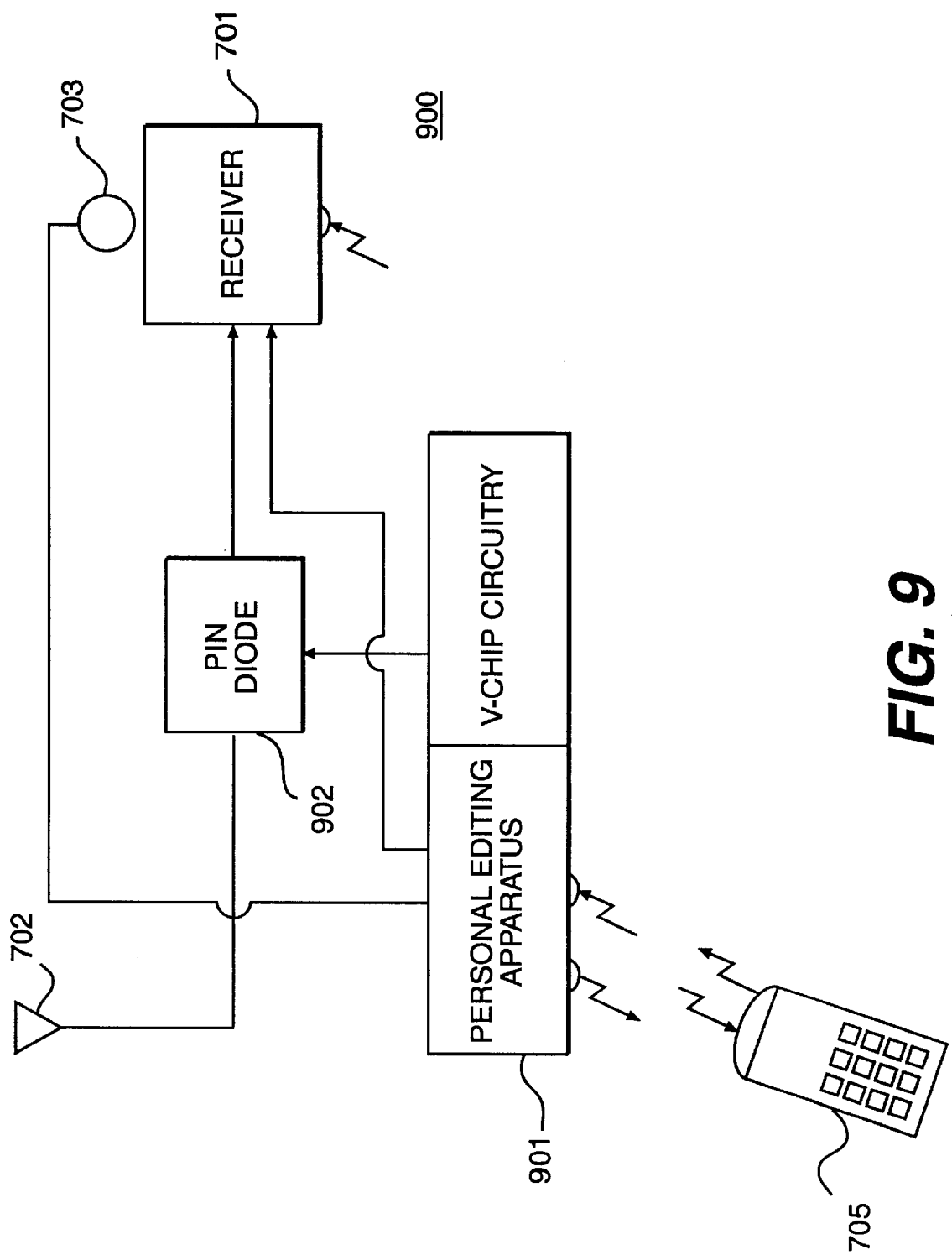
FIG. 9 is a block diagram of a third personal editing system consistent with the present invention.

FIG. 9 is a block diagram of a third type of personal editing system 900 consistent with the present invention. The system shown in FIG. 9 includes a personal editing/v-chip apparatus 901. Apparatus 901 performs all of the personal editing features previously described as well as v-chip functions. That is, the system can be set so that programming having a rating higher than that preset by the viewer is blocked. Such a system is shown and described in U.S. application ser. No. 08/780,294, which is incorporated herein by reference. The apparatus shown in FIG. 9 also includes a pin diode 902, which switches off input from antenna 702 when program data is being displayed. Such a pin diode can be incorporated in the previously described embodiments.

Figure 10:
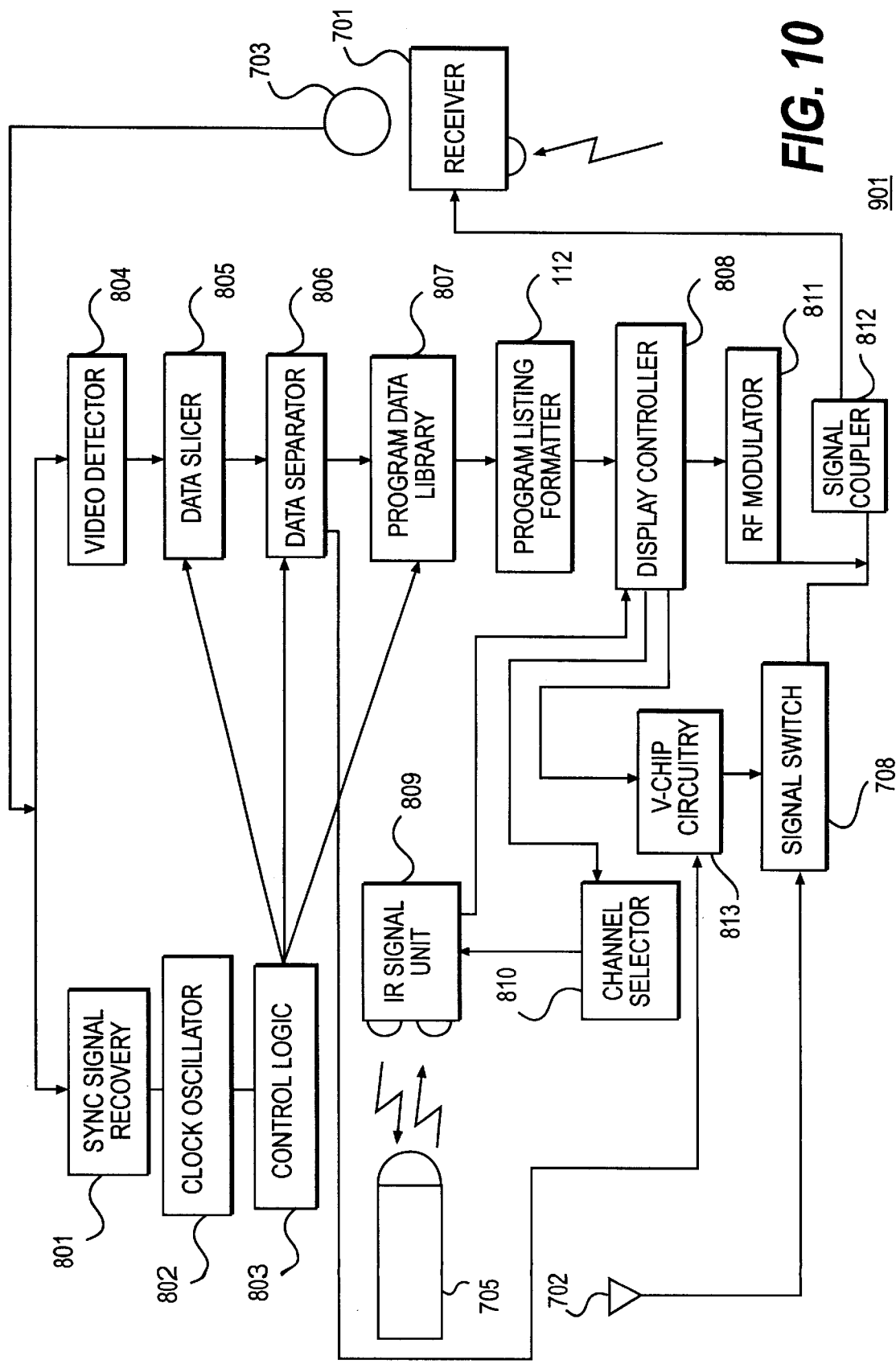
FIG. 10 is a block diagram of the personal editing/V-chip apparatus shown in FIG. 9.

FIG. 10 is a block diagram of the personal editing/v-chip apparatus 901 shown in FIG. 9. The personal editing and v-chip circuits share much of the circuitry of the combined unit. They share the IF probe 703, sync signal recovery circuit 801, video detector 804, remote control 705, and pin diode switch 902. Both the personal editing and the v-chip functions require the capability to switch the incoming RF signal from the antenna to the television set. In general, the personal editing system 900 functions the same as system 700 (FIG. 7). The v-chip function in system 900 enhances the utility of the overall unit but requires very minor increases in circuitry since both functions (editing and V-chip) have many identical circuit requirements.

Figure 11:
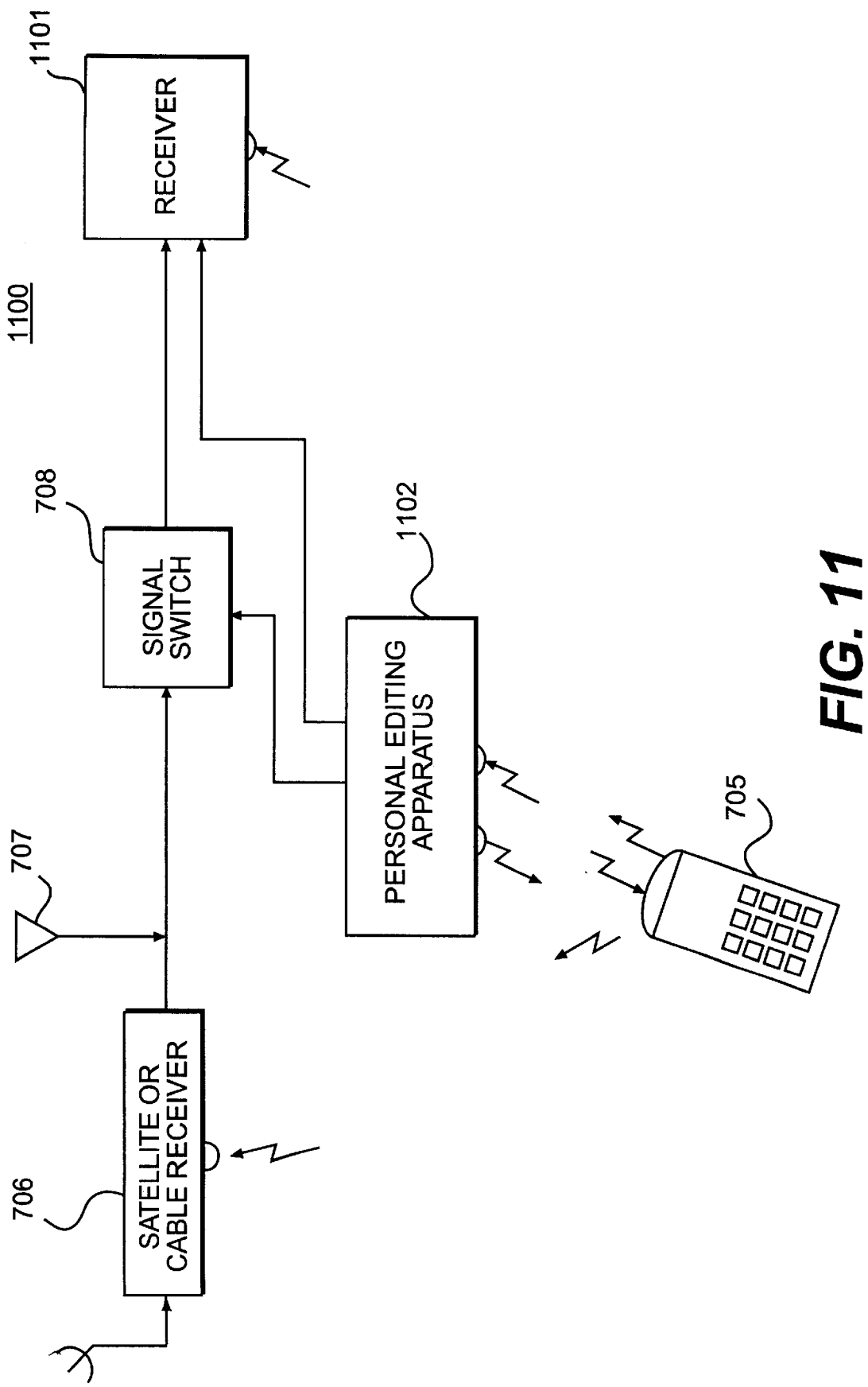
FIG. 11 is a block diagram of a fourth personal editing system consistent with the present invention.

FIG. 11 is a block diagram of another personal editing system consistent with the present invention. As shown in FIG. 11, this system 1100 does not use an IF probe for detecting extended data containing program information from receiver 1101. Instead, system 1100 simply monitors the viewing habits (history) of those using the receiver 1101, either with or without satellite or cable reception. If each user enters an identification number (PIN), using remote control 705 or some other data entry device, or somehow separately identifies themself, system 1100 can provide a personalized history permitting each viewer to easily find favored programs based upon time and day and other program selection criteria.

The personal editing apparatus 1102 monitors the channel selection activity of the remote control 705 and stores the data along with the time-of-day, day-of-week, and "on" and "off" commands to the receiver 1101. This data is correlated and stored in a program history library, described in greater detail in FIG. 12. Upon request from the viewer, the data is graphically displayed on television 1101 via an RF modulator on channels 2, 3 or 4, or any other unused channel. Use of system 100 permits, for example, parents to review the viewing history data of children. Preferably, display screens are provided giving a summary of channel numbers and times viewed for each user. This data can be presented in tabular or statistical form. The features of the personal editing apparatus 1102, including the use of the program history library 1201 can be incorporated in the other personal editing apparatuses described herein.

Figure 12:
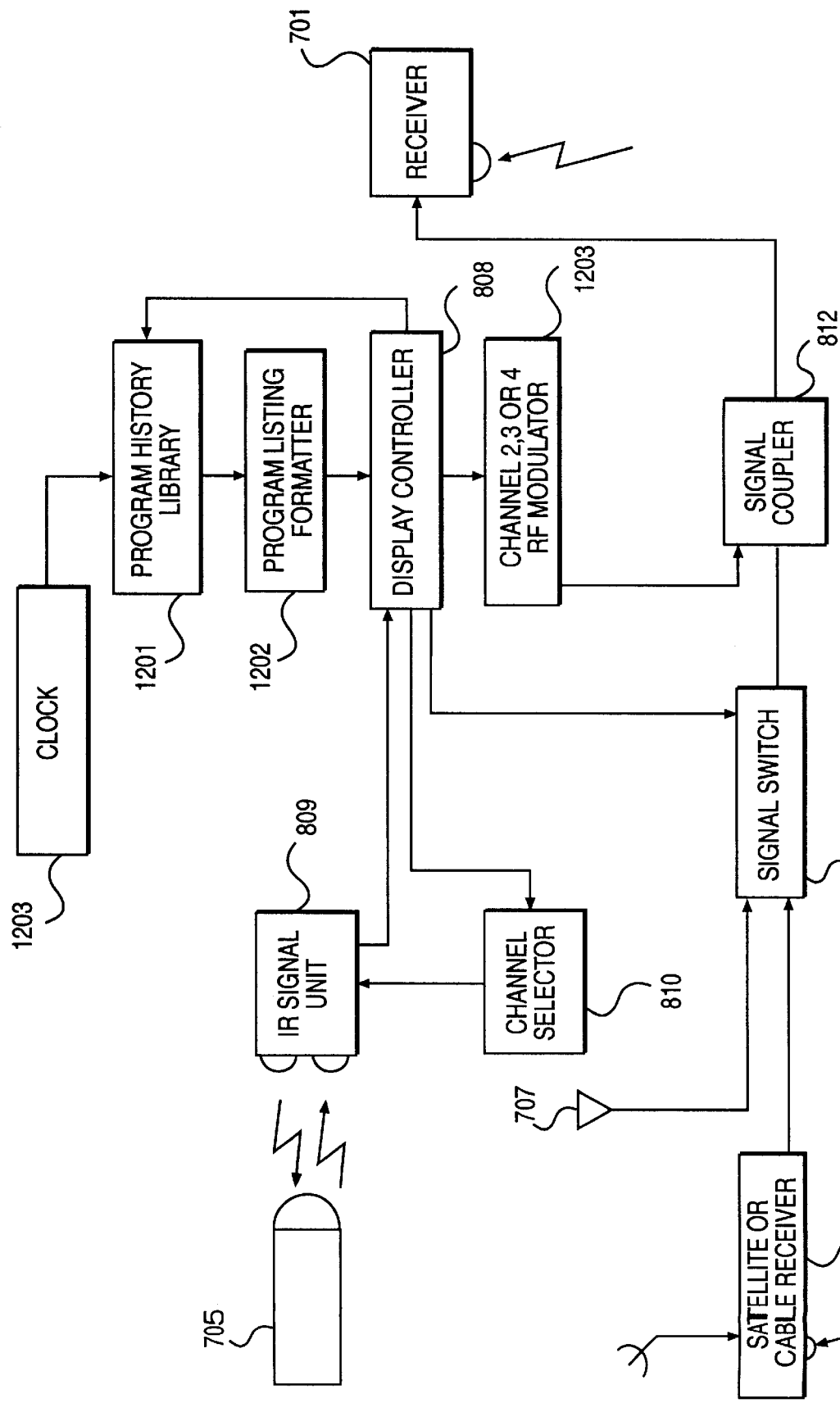
FIG. 12 is a more detailed block diagram of the personal editing apparatus shown in FIG. 11.

FIG. 12 is a block diagram of the personal editing apparatus 1102 shown in FIG. 11. Using the remote control 705, the viewer may select desired channels. Upon making a particular selection, the personal editing apparatus 1102 will send the channel number command to the remote control 705, which will in turn relay the channel number command to the receiver 701 (including satellite or cable receiver). The viewer may also directly select the preferred channel number using the remote control 705, and personal editing apparatus 1102 will monitor and store the selection.

As shown in FIG. 12, remote control input information is input to display controller 808. That information is sent to program history library 1201, which stores information about channels selected by the viewer. The clock 1203, coupled to the program history library 1201, records the time and day of week associated with the selected channels, and also provides a record of the duration that each channel is viewed. In this way, a history of viewed programming for a plurality of viewers or particular viewer can be constructed. Such a history is formatted by the program listing formatter 1202 which outputs the formatted signal to the display controller 808. The channel 2, 3, or 4 modulator 1203 modulates the history information for display on the receiver 701.

The personal editing apparatus 1102 shown in FIGS. 11 and 12 differs from the previously described personal editing apparatuses in that it does not involve the use of any extended data. Instead, personal editing apparatus 1102 compiles a history of past viewing habits based solely on channel number selected and the time of day and day of week the channel number was selected.

Figure 13:
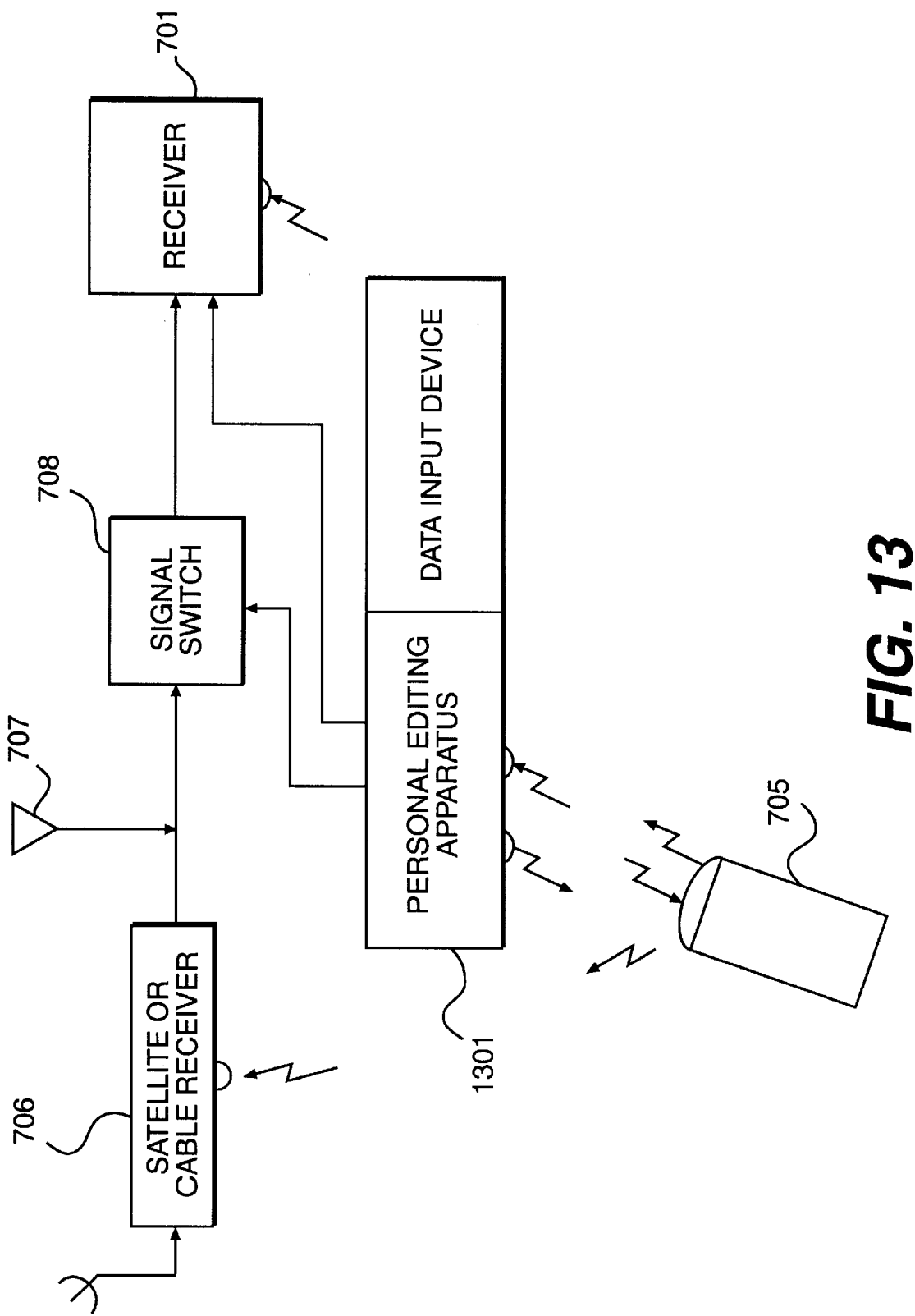
FIG. 13 is a block diagram of a fifth personal editing system consistent with the present invention.

FIG. 13 is a block diagram of another personal editing system consistent with the present invention. This configuration does not contain an IF probe for collecting program data, but rather relies on a data input device as part of the personal editing apparatus 1301 for inputting data from an external source.

The personal editing apparatus 1301 can be used, for example, in instances in which tie broadcaster does not include program related data, i.e., extended data, with the programming information. Rather, program related data is stored and accessed from a source distinct from the broadcast transmission. For instance, an Internet Web site may contain program related data concerning future programming such as in a "TV Guide" type format. This information is input to the personal editing apparatus 1301 by, for example, a modem on a regular basis, such as, once a week. The program related data generally includes information such as program title, channel number, content description, and time and date of program. Other external sources for program related data include, for example, magnetic card data, telephone modem data, personal computer data, separate dedicated television channel data, radio signal data, satellite transmission data, etc.

Figure 14:
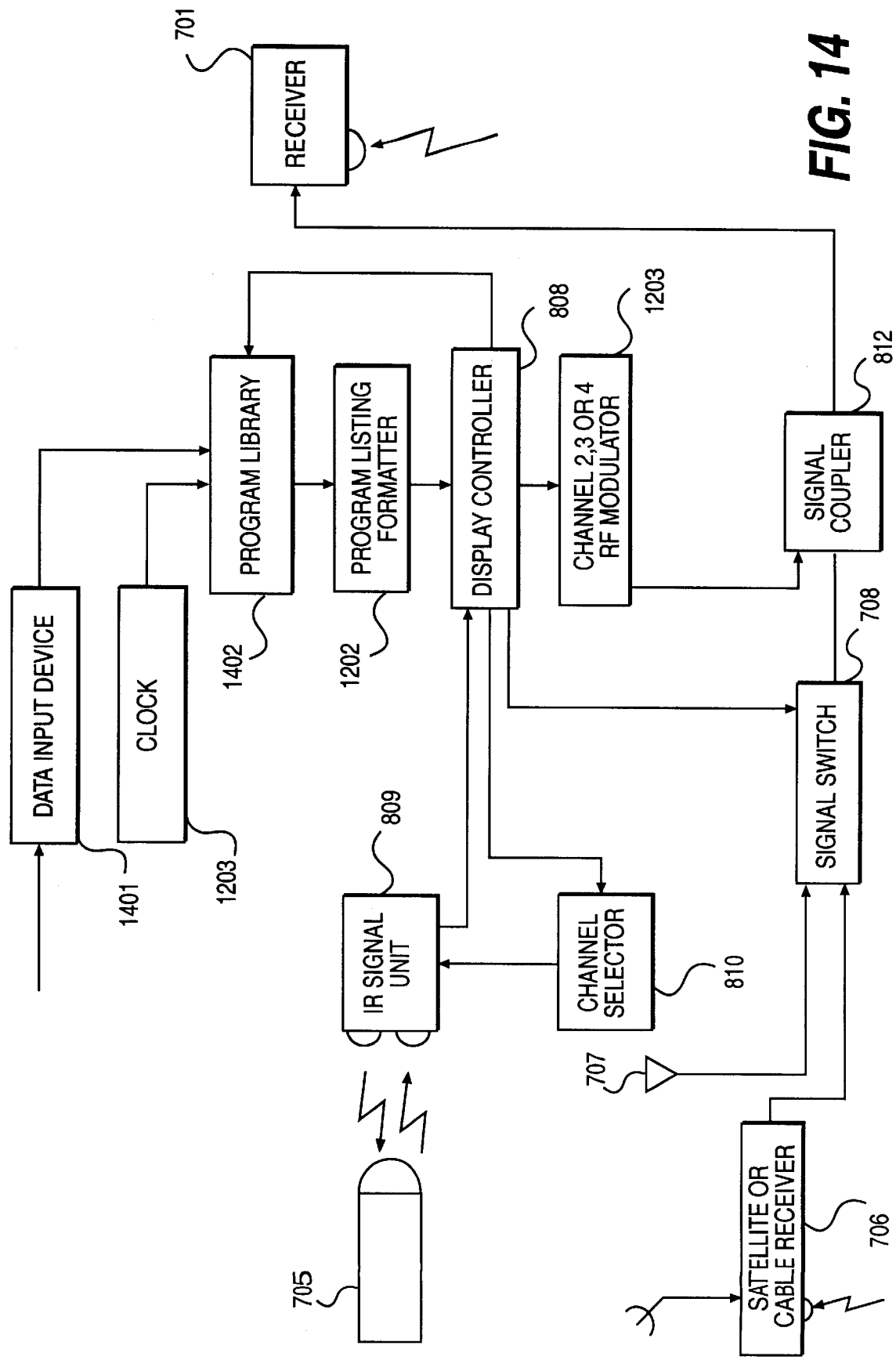
FIG. 14 is a more detailed block diagram of the personal editing apparatus shown in FIG. 13.

FIG. 14 is a block diagram of the personal editing apparatus 1301 connections to the receiver 701 satellite or cable receiver 706 and signal switch 708 are the same as shown and described with respect to FIG. 1, as shown in FIG. 13. The personal editing apparatus 1301 includes a data input device 1401, which receives the program related data from the external source, as described above. Data input to the data input device 1401 is preferably stored in the program library 1402 and can be graphically displayed to the viewer upon demand. Using this data, the viewer can make channel selections using the remote control 705 by means of cursor movements or direct channel number commands to the television receiver (including satellite or cable receiver). As in the other embodiments, this embodiment also preferably includes the viewing history data library to allow viewers to return easily to their most often viewed channels at various times of day and days of the week. The external data sources listed above included telephone modem data and personal computer data. To access these data, a telephone modem or a personal computer to which the personal editing unit is connected, will automatically dial up and connect to a television program data source. This data source will contain program information such as channel number, program title, start time, program length, movie rating, content descriptors (type), etc. This information will be tailored to the viewing location and program source (cable, satellite, etc.) used by the viewer. On a regular basis, for example, once per day, the personal editing apparatus 1301 may direct the telephone modem or personal computer to interface with the program data source. Alternatively, the personal computer may independently establish the interface with the television program data source and subsequently transfer the data to the personal editing apparatus 1301. At some prior time, the viewer will have entered within the personal editing apparatus 1301 using a menu screen and cursor, or within the personal computer, using the keyboard, information describing his geographic location and program source (cable, satellite, etc.). The system will automatically download the appropriate program information into the program library 1402. After the information has been retrieved, the system will automatically disconnect from the data source.

The external data sources may also include a radio receiver. This might be of the type used for paging services. The radio receiver would preferably receive, on a daily basis, program information as described above. When using a radio receiver, the viewer may furnish information to the data provider describing the program source (cable, satellite, etc.) and the viewer's geographic location. In a similar manner, the radio receiver might also be a portion of a television set receiver or satellite receiver which automatically tunes to a specific channel on a daily basis for the purpose of gathering program data, as described above. The specific channel to which the television receiver or satellite receiver automatically tunes will be dedicated to sending program data specifically to aid viewers in selecting programs for viewing.

Figure 15:
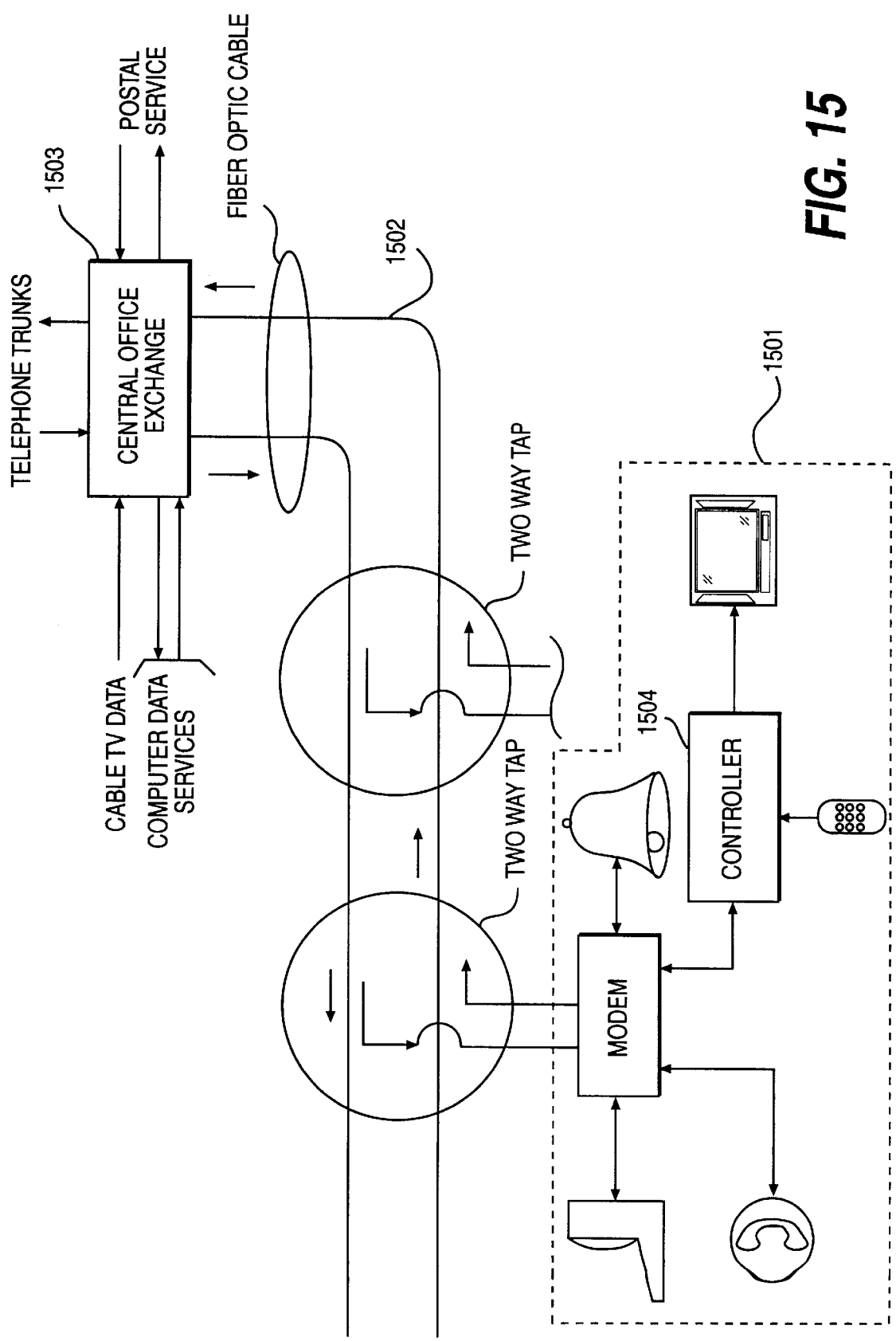
FIG. 15 is a block diagram of a sixth personal editing apparatus consistent with the present invention.

FIG. 15 is a block diagram of another personal editing system consistent with the present invention. FIG. 15 illustrates a fiber optic data system in which telephone, cable TV, etc. are conveyed over a common wide-band (1.5 Mbs to 30 Mbs) two way system 1502. In such a system, each user or subscriber will select one or more television programs (one for each set in use or for each picture-in-picture) from those available within the cable TV data source. Digital data for the channels/programs selected, will be switched and sent to the home television equipment 1501, which will display the programs. The actual switching of the channel or program data takes place within the central office equipment 1503.

Personal editing apparatus is implemented within the home equipment television controller 1504 as an aid to program selection. The television controller 1504 is supplied continuously with program guide information, as described above, from the central office equipment 1503. The personal editing apparatus operates as described in the previous embodiments.

While some systems and methods consistent with the present invention have been described, those skilled in the art understand that various changes and modifications may be made, and equivalents may be substituted for elements thereof without departing from the scope of the present invention.

In addition, many modifications may be made to adapt a particular element, technique or implementation to the teachings of the present invention without departing from the central scope of the invention. Therefore, it is intended that this invention not be limited to the particular embodiments and methods disclosed herein, but that the invention involve all embodiments falling within the scope of the appended claims.

What is claimed is:

1. A television editing system comprising:
    an input device for receiving and buffering externally provided television programming information;
    a data sorter for extracting and sorting additional data associated with the input television programming information;
    memory means for separately storing the additional data;
    a user control for inputting television programming criteria to identify programming;
    a signal receiving unit for receiving signals, the signals including the television programming criteria;
    a display controller, coupled to the memory means, for controlling display of personalized information about television programming based on the stored additional data and the television programming criteria; and
    a signal transceiver for relaying signals between the signal receiving unit and a receiver, the signals including a channel selection signal to automatically change the channel on the receiver so that the personalized information can be displayed.

2. The television editing system according to claim 1, wherein the input device includes means for receiving the television programming information from one of an antenna, a cable, a direct broadcast satellite, a fiber optic cable, and a telephone line.

3. The television editing system according to claim 1, wherein the additional data is input from one of a television, radio, telephone line, and external storage device.

4. The television editing system according to claim 1, wherein the user control comprises one of an infrared remote control, a keyboard, a card reader, a scanner, and a magnetic disc reader, and a memory recording device.

5. The television editing system according to claim 1, wherein at least one of the input device, the data sorter, the memory means, the signal receiving unit, and the display controller is incorporated within a television receiver.

6. The television editing system according to claim 1, wherein the system is external to a television receiver.

7. The television editing system according to claim 1, wherein the display controller includes means for coupling to a television receiver.

8. The television editing system according to claim 6, wherein the input device includes means for receiving the television programming information via an IF signal output from the television receiver.

9. The television editing system according to claim 8, wherein the input device further comprises an IF probe coupled to the television receiver for detecting the IF signal output from the television receiver.

10. The television editing system according to claim 7, wherein the coupling means comprises a video-out connection.

11. The television editing system according to claim 1, further comprising v-chip circuitry to prevent display of television programming having a rating greater than a preselected rating.

12. The television editing system according to claim 1, wherein the user control comprises a memory device for storing a previously selected channel number.

13. The television editing system according to claim 1, wherein a plurality of users can input television programming criteria such that the display controller controls display of personalized information regarding each of the plurality of users.

14. The television editing system according to claim 1, wherein the personalized information is displayed as a picture within a picture on a television display screen.

15. The television editing system according to claim 1, further comprising scanning and displaying means for scanning and displaying selected television programs identified by the personalized information.

16. The television editing system according to claim 1, further comprising an identification entry device for entry of a personalized identification number prior to entry of the television programming criteria.

17. The television editing system according to claim 1, further comprising a program history library for storing program time and channel information.

18. The television editing system according to claim 1, wherein the signal transceiver is incorporated within the user control.

19. The television editing system according to claim 1, wherein the receiver comprises one of a television receiver, a cable receiver, or a satellite receiver.

20. A television editing system comprising:
    a user control for inputting television programming criteria to identify programming;
    a signal receiving unit for receiving signals, the signals including the television programming criteria;
    a program history library for storing information related to viewing habits of a user of the television editing apparatus based on the input television programming criteria
    a display controller, coupled to the memory means, for controlling display of personalized information about television programming based on the stored information in the program history library; and
    a signal transceiver for relaying signals between the signal receiving unit and a receiver, the signals including a channel selection signal to automatically change the channel on the receiver so that the personalized information can be displayed.

21. The television editing system according to claim 20, further comprising a monitoring device allowing for monitoring of the program history library of another user.

22. The television editing system according to claim 20, further comprising an input device for receiving and buffering externally provided television programming information.

23. The television editing system according to claim 22, wherein the input device includes means for receiving the television programming information from one of an antenna, a cable, a direct broadcast satellite, a fiber optic cable, and a telephone line.

24. The television editing system according to claim 22, wherein the user control comprises one of an infrared remote control, a keyboard, a card reader, a scanner, and a magnetic disc reader, and a memory recording device.

25. The television editing system according to claim 20, wherein at least one of the signal receiving unit, the program history library, and the display controller is incorporated within a television receiver.

26. The television editing system according to claim 20, wherein the system is external to a television receiver.

27. The television editing system according to claim 20, wherein the display controller includes means for coupling to a television receiver.

28. The television editing system according to claim 27, wherein the coupling means comprises a video-out connection.

29. The television editing system according to claim 20, wherein the user control comprises a memory device for storing a previously selected channel number.

30. The television editing system according to claim 20, wherein a plurality of users can input television programming criteria such that the display controller controls display of personalized information regarding each of the plurality of users.

31. The television editing system according to claim 20, wherein the personalized information is displayed as a picture within a picture on a television display screen.

32. The television editing system according to claim 20, further comprising scanning and displaying means for scanning and displaying selected television programs identified by the personalized information.

33. The television editing system according to claim 20, further comprising an identification entry device for entry of a personalized identification number prior to entry of the television programming criteria.

34. The television editing system according to claim 20, wherein the signal transceiver is incorporated within the user control.

35. The television editing system according to claim 20, wherein the receiver comprises one of a television receiver, a cable receiver, or a satellite receiver.

36. A method of editing a program display comprising the steps of:
   acquiring additional data from received television programming;
   entering program parameters identifying desired programming using a user control;
   building a list of program information based on the additional data and the program parameters;
   controlling a receiver by relaying signals through the user control, the signals including a channel selection signal to automatically change the channel on the receiver so that the list of program information can be displayed;
   displaying the list of program information; and
   selecting a program from the list.

37. The editing method according to claim 36, wherein the acquiring step includes the substep of acquiring the received television programming information from one of an antenna, a cable, a direct broadcast satellite, a fiber optic cable, and a telephone line.

38. The editing method according to claim 36, wherein the acquiring step includes the substep of acquiring the additional data from one of a television, radio, telephone line, and external storage device.

39. The editing method according to claim 36, wherein the entering step includes the substep of entering the program parameters with a user control comprising one of an infrared remote control, a keyboard, a card reader, a scanner, and a magnetic disc reader, and a memory recording device.

40. The editing method according to claim 36, wherein at least one of the acquiring, the building, and the controlling steps is performed within a television receiver.

41. The editing method according to claim 36, wherein at least one of the acquiring, the building and the controlling steps is performed external to a television receiver.

42. The editing method according to claim 36, wherein the displaying step includes the substep of coupling to a television receiver.

43. The editing method according to claim 41, wherein the acquiring step comprises the substep of receiving the television programming information via an IF signal output from the television receiver.

44. The editing method according to claim 43, wherein the acquiring step further comprises the substep of detecting the IF signal output from the television receiver via an IF probe coupled to the television receiver.

45. The editing method according to claim 42, wherein the coupling substep comprises coupling to a video-out connection of the television receiver.

46. The editing method according to claim 36, further the step of preventing displace of television programming having a rating greater than a preselected rating.

47. The editing method according to claim 36, wherein the entering step comprises storing a previously selected channel number.

48. The editing method according to claim 36, wherein a plurality of users can enter program parameters so that a separate list of program information can be displayed for each of the plurality of users.

49. The editing method according to claim 36, comprising the step of displaying the program information as a picture within a picture on a television display screen.

50. The editing method according to claim 36, further comprising the steps of scanning and displaying selected television programs identified by the program information.

51. The editing method according to claim 36, further comprising the step of entering a personalized identification number prior to the step of entering program parameters.

52. The television editing apparatus according to claim 36, further comprising the step of storing program time and channel information in a program history library.

53. The editing method according to claim 36, wherein the receiver comprises one of a television receiver, a cable receiver, or a satellite receiver.

54. A method of editing a program display comprising the steps of:
   inputting television programming criteria to identify programming using a user control;
   storing information in a program history library related to viewing habits of a user based on the input television programming criteria;
   building a list of program information based on the stored information in the program history library;
   controlling a receiver by relaying signals through the user control, the signals including a channel selection signal to automatically change the channel on the receiver so that the list of program information can be displayed;
   displaying the list of program information;
   selecting a program from the list.

55. The editing method according to claim 54, further comprising the step of monitoring the program history library of another user.

56. The editing method according to claim 54, further comprising receiving and buffering externally provided television programming information.

57. The editing method according to claim 56, wherein the receiving step includes the substep of receiving the television programming information from one of an antenna, a cable, a direct broadcast satellite, a fiber optic cable, and a telephone line.

58. The editing method according to claim 54, wherein the inputting step includes the substep of inputting the program parameters with a user control comprising one of an infrared remote control, a keyboard, a card reader, a scanner, and a magnetic disc reader, and a memory recording device.

59. The editing method according to claim 54, wherein the at least one of the storing, the building, and the controlling steps is performed within a television receiver.

60. The editing method according to claim 54, wherein the at least one of the storing, the building, and the controlling steps is performed external to a television receiver.

61. The editing method according to claim 54, wherein the displaying step includes the substep of coupling to a television receiver.

62. The editing method according to claim 61, wherein the coupling substep comprises coupling to a video-out connection of the television receiver.

63. The editing method according to claim 54, wherein the controlling step comprises storing a previously selected channel number.

64. The editing method according to claim 54, wherein a plurality of users can enter program parameters so that a separate list of program information can be displayed for each of the plurality of users.

65. The editing method according to claim 54, further comprising the step of displaying the program information as a picture within a picture on a television display screen.

66. The editing method according to claim 54, further comprising scanning and displaying selected television programs identified by the programming criteria.

67. The editing method according to claim 54, further comprising the step of entering a personalized identification number prior to the step of entering program parameters.

68. The editing method according to claim 54, wherein the receiver comprises one of a television receiver, a cable receiver, or a satellite receiver.

* * * * *